United States Patent [19]

Kastenberger et al.

[11] Patent Number: 5,263,733

[45] Date of Patent: Nov. 23, 1993

[54] SECURING MEANS

[76] Inventors: Frank D. Kastenberger, 2 Pauls Court; Raymond M. Rieger, 22A Unsworth Road, both of Ringwood, 3134, Australia

[21] Appl. No.: 808,596

[22] Filed: Dec. 17, 1991

[30] Foreign Application Priority Data

May 17, 1991 [AU] Australia .............. PK6179

[51] Int. Cl.⁵ ................................ B60P 3/10
[52] U.S. Cl. .................... 280/414.1; 114/344
[58] Field of Search ........... 280/414.1, 414.3, 508, 280/510; 114/344; 414/536; 410/69, 106

[56] References Cited

U.S. PATENT DOCUMENTS

| | | | |
|---|---|---|---|
| 2,763,384 | 9/1956 | Foster | 414/536 |
| 3,632,138 | 1/1972 | Whitley | 280/405 |
| 3,831,790 | 8/1974 | Farris | 280/414.1 X |
| 3,938,829 | 2/1976 | Anderson | 280/414.1 |
| 3,963,263 | 6/1976 | Whitlock | 280/414.1 |
| 3,989,267 | 11/1976 | Robinson | 280/414.1 |
| 4,114,920 | 9/1978 | Boettcher | 280/414.1 |
| 4,225,149 | 9/1980 | Koopman | 280/508 X |
| 4,463,965 | 8/1984 | Lawson | 280/510 |
| 4,641,851 | 2/1987 | Knies | 280/414.1 |
| 4,784,545 | 11/1988 | Lawrence | 280/491.1 X |
| 4,826,197 | 5/1989 | Heinzen | 280/414.1 |
| 4,919,446 | 4/1990 | Higgins | 280/414.1 |
| 5,000,471 | 3/1991 | Sumrall | 280/414.1 |
| 5,114,168 | 5/1992 | Kehl | 114/344 X |

FOREIGN PATENT DOCUMENTS

| | | |
|---|---|---|
| 40205/72 | 3/1972 | Australia . |
| 52702/90 | 10/1990 | Australia . |
| 18842/88 | 2/1991 | Australia . |
| 2814805 | 4/1977 | Fed. Rep. of Germany . |
| 2809970 | 3/1978 | Fed. Rep. of Germany . |
| 1290131 | 1/1970 | United Kingdom . |
| 1374034 | 3/1972 | United Kingdom . |
| 2558746 | 12/1975 | United Kingdom . |

*Primary Examiner*—Margaret A. Focarino
*Assistant Examiner*—Victor E. Johnson
*Attorney, Agent, or Firm*—Frank P. Presta

[57] ABSTRACT

A latch for releasably securing a boat includes an exposed hook member designed to releasably engage a complementary eye member mounted on a boat and a remotely operable actuator to disengage the hook member from the complementary eye member. The hook member is biased to rest in a first closed position and can be vertically moved to a second open position either by operation of the actuator or by contact with the complementary eye member. An augmentry eye member and clamp may be used to configure the auxiliary eye member in a horizontal orientation if an eye member mounted on the boat is vertically orientated.

21 Claims, 3 Drawing Sheets

SECURING MEANS

BACKGROUND OF THE INVENTION

This invention relates to a securing means. More particularly, this invention involves an automatic latch for releasably securing a boat.

Drive-on trailers have been a recent development in the loading and unloading of small boats. Traditionally, the trailers included smooth, substantially non-rolling surfaces on which to support a boat for loading. Such a trailer arrangement made it necessary to locate the trailer partially submerged in the water and to haul the boat up onto the trailer, bow first, by winch or like means. The recently introduced "drive-on" trailer arrangement makes it possible to drive the boat onto the partially submerged trailer using the propulsion of the boat itself. The boat, upon being fully loaded, may be secured to the trailer by winch or like means. The prior art therefore requires that an operator must get into the water to get to the winch in order to secure the boat. Moreover, the arrangement requires one operator to pilot the boat and another to secure the boat by the winch.

SUMMARY OF THE PRIOR ART

There have been several attempts to devise a latch for releasably securing a boat.

For instance, in U.S. Pat. No. 3,632,138 (Whitely) there is disclosed a boat trailer including a latch structure operative in loading and unloading a boat. The trailer includes a curved latch bar portion secured to the trailer adapted to co-act with a latch catch mechanism supported on the prow of the boat. However, the latch catch mechanism must be manually preset to a position capable of receiving and latching to the latch bar. Moreover, the latch bar is only manually releasable from the latch catch mechanism.

U.S. Pat. No. 3,831,790 (Farris) discloses a wheeled carriage and rails arrangement adapted for use on a boat trailer for securing a boat thereto. The carriage includes supporting arms 23,23 of U-shaped configuration for engaging the bow of the boat. The exact nature of the engagement of the bow to the arms is not disclosed. The carriage is adapted for releasable engagement with a spring biased latch affixed to the front of the trailer. The latch may be operable by a driver of the boat by means of a cable 43 extending between the latch and a location in reach of the driver. As those skilled in the art would appreciate, however, the installation of such an arrangement would be relatively difficult and the overall arrangement expensive due to the nature and bulk of the components used.

U.S. Pat. No. 3,938,829 (Anderson) discloses a latch device fitted to a trailer. The latch is designed to engage an elongated, vertically oriented, U-shaped bow eye mounted on the bow of the boat. In operation, the latch includes a spring loaded lockable bar which may be deflected by the incoming bow eye and returned to its first position to secure the bow eye. To release the bow eye the bar may be secured in a retracted position by means of a pawl. However, the bar must be manually released from its retracted position to enable it to receive the mooring bow eye upon loading the boat.

In U.S. Pat. No. 3,963,263 (Whitlock) there is described a latch for engagement with the bow eye of a boat. The latch includes a pair of spring loaded strikers which deflect against the bias to receive the bow eye of a boat and automatically close behind the bow eye due to the action of the bias. However, the bow eye must be manually released from the latch for launching.

In U.S. Pat. No. 3,989,267 (Robinson) a spring loaded bolt capable of being locked in an open position whereby it is adapted to snap into closed position upon activation of a trigger by an oncoming bow eye of a boat whereby to engage the bow eye is described. However, the bolt must be manually retracted to open position to enable launching of the boat. Similar comments are applicable to the fastening assembly described in U.S. Pat. No. 4,114,920 (Boettcher).

In U.S. Pat. No. 4,641,851 (Knies) there is described a hook arrangement including a pivotal hook movable from a open position and a closed position by adjustable handle 76. The bow eye includes a notched keeper 64 required to form complementary engagement means with the hook. The standard bow eye found on most boats is not readily adapted for complementary engagement with the described hook member.

U.S. Pat. No. 4,826,197 (Heinzen) discloses a remote controlled arcuate electrically driven pin arrangement. However, the pin arrangement is not adapted for automatic engagement with an oncoming bow eye of a boat. Rather, the electrical driving means must be activated to open the pin arrangement to receive the bow eye and further activated to secure the bow eye.

In U.S. Pat. No. 4,919,446 (Higgins) the invention concerns a spring-loaded bolt requiring pre-setting, as with Robinson, to receive an oncoming bow eye of a boat. The invention also includes a trigger mechanism by which the spring loaded bolt when in its loaded and retracted position may be released to a closed position upon receiving the bow eye.

Finally, in U.S. Pat. No. 5,000,471 (Sumrall) a latch mechanism may be pre-set to receive and secure an oncoming bow eye of a boat. However, launching the boat requires the manual release of a pawl or latch plate.

The above prior art in general is poorly adapted for the rigours of boat loading when it involves powering a boat onto a suitably adapted trailer. As the skilled person will appreciate, as a boat is powered onto a trailer, the bow of the boat is unnaturally elevated due to the driving force from the rear. When the driving force from the rear ceases the bow sags. If there is no securing means the boat naturally reversibly slides down under the force of gravity. However, if the boat is secured to the trailer, the boat comes to rest in a position whereby the bow is significantly lower than its initial elevation when the boat was initially driven onto the trailer. The above prior art generally requires a lower tolerance for accuracy in loading the boat than is required to successfully secure the boat to the trailer when loaded onto the trailer in the above manner.

SUMMARY OF THE INVENTION

It is therefore an object of the present invention to provide in one embodiment a latch for releasably securing a boat which at least partially alleviates some or all of the above mentioned deficiencies in the known prior art and/or provides useful alternatives to known apparatus.

Accordingly, the present invention provides, in one embodiment, a latch for releasably securing a boat, said latch comprising:

a hook member adapted for releasably engaging a complementary eye member mounted on a boat; and actuation means adapted for operation from a remote location whereby to disengage said hook member and said complementary eye member;

wherein said hook member is biased to rest in a first closed position but may be moved against said bias to a second open position by the operation of said actuation means and by the interaction with said complementary eye member without operation of said actuation means.

The present invention also provides in another embodiment a latch for releasably securing a boat to a boat trailer, said latch comprising:

mounting means for mounting said latch on said trailer;

a hook member adapted for releasably engaging a complementary eye member mounted on said boat; and actuation means adapted for operation from a remote location whereby to disengage said hook member and said complementary eye member;

wherein said hook member is biased to rest in a first closed position and adapted to be moved against said bias to a second open position by the operation of said actuation means and by said complementary eye member pressing on said hook member in the absence of operation of said actuation means.

The boat trailer may be of conventional type adapted to carry a trailable boat and to be towed by a prime mover. The prime mover may be a standard automobile or like vehicle as is common in the art for towing trailable boats on land. Preferably, the trailer is of the "drive-on" type whereby the trailable boat may be driven onto the partially submerged trailer without winching or like operation. Still more preferably, the trailer includes rollers for substantially friction-reduced transfer of the boat fully onto the trailer as well as guides for orienting the boat in a predetermined position.

The latch provided by the present invention may include any complementary coupling system for releasably securing the boat to the trailer. The system preferably includes a hook and eye type arrangement. The hook member may be part of the latch and may be adapted for releasably engaging a complementary eye member mounted on a boat. It will be appreciated by those skilled in the art that the reverse arrangement, i.e. that the hook member be on the boat and the eye member on the latch and other equivalents, e.g. a pair of complementary hooks, a hasp and staple, a hook and saddle or the like are equally within the scope of the invention.

The hook member may be resiliently displaceable from a first closed position to a second open position. The hook member may be biased to automatically return to the first closed position upon being displaced to the second open position. The hook member may thus be biased to rest in the first closed position but may be moved against the bias to the second open position. A spring means may act to bias the hook member to rest in the closed position. The hook member may be pivotally mounted relative to a housing.

The hook member may include a free hook end and a pivotally mounted end. The free hook end may include an open hook. The hook member may include a saddle or recess. The saddle may be adapted to receive the eye member. The hook member may include an external cam surface to abut the eye member prior to engagement.

The eye member may be rigidly mounted on the boat to be secured. The eye member may be mounted centrally on the bow of the boat. The eye member may include one or more support rods mounted on the bow and extending to a free eye portion end. The free end may include a closed eye. The eye member may comprise a U-shaped member. The U-shaped member may include a pair of arms mounted to the bow. The eye member may be horizontally oriented. Where an existing eye member of a boat is vertically oriented, an augmentary eye member may be provided to present an eye member in horizontal orientation. The augmentary eye member may be adapted to be affixed to the existing eye member. The means of fixing the augmentary eye member to the existing eye member may be by clamp means. The eye is preferably adapted to receive the hook member.

The hook and eye members may be engageable whereby, upon the eye member approaching and forcibly abutting the cam surface when the hook member is in the first closed position, the hook member may be displaced to the second open position. Upon the further passage of the eye member past the cam surface of the hook member and into the recess or saddle, the eye member and the hook member may become engaged with the hook member reverting under the action of the bias to the first closed position.

The hook member may be configured to rotate about a pivot means. The hook member is preferably pivotally mounted relative to a housing. The hook member may thus be adapted to pivot between the first and second positions. Pivot means may be provided in the form of a pivot bolt. Preferably, the latch provided by the present invention includes retraction means coacting with the pivot bolt whereby the hook portion returns to the first position automatically in the absence of displacement forces. The retraction means may bias the hook member to rest in the first closed position and may be in the form of a spring or any other resiliently deformable means known to the art.

According to the invention in at least one embodiment the actuation means may, in addition to other means, be operated by manual means. The manual means may include a lever adapted for hand manipulation. The actuation means may include, for example, a cable, cord, wire or rod or any other means adapted for the purpose whereby the actuation means may be manually operated from a remote location, for example, at the helm of the boat.

In another aspect of the invention according to at least one embodiment, the actuation means may include drive means. The drive means may include any known and applicable means adapted, as part of the actuation means, to disengage the hook member and the complementary eye member. The drive means may include pneumatic means. The drive means may include hydraulic means. The drive means preferably, however, comprises electrically driven means.

The electrically driven means may include an electric motor. The motor may be adapted to effect the displacement of the hook member in a number of ways. For example, the motor may include a rotatable spool. The hook member may be displaced by attaching ends of a wire to the hook member and spool respectively whereby the rotation of the wheel causes displacement of the hook member from the first closed position to the second open position. In another example, the electric motor may be operable by means of a screw plunger which rotates to effect displacement of the hook member.

In a preferred arrangement, the electrically driven means includes a solenoid to effect disengagement of the hook member and the complementary eye member. The solenoid may be operable to be electrically energised. When the solenoid is energised it may be adapted to withdraw a plunger. The plunger may be operably connected via transfer means to the hook member. Therefore, when the solenoid is energised, the plunger is withdrawn and the hook member displaced from a first position to a second position.

The solenoid may be operably adapted to be energised by radio control means. The solenoid may be adapted to be operably energised by a direct electrical connection.

In a particularly preferred embodiment, an operator in the towing vehicle may transmit an electrical signal by operating electrical switch means located in the vehicle via the direct electrical connection in the form of a wire connection to the solenoid to thereby energise the solenoid. Preferably the solenoid may be similarly energised from the vantage point of the boat by the radio control means. The radio control means may be adapted to send a radio signal via a radio receiver to energise the operation of the solenoid via the switch means.

The actuation means may be so constructed that the drive means operates directly in connection with the hook member. The actuation means may have transfer means. The transfer means may be adapted to transfer the effect of the drive means to the hook member. The transfer means may include a rigid rod connected at one end to the drive means and at the other end to the hook member. In another arrangement, the transfer means may include a flexible but taut wire similarly connected.

In one preferred arrangement the transfer means comprises a rigid rod. The rigid rod is so configured to allow free movement of the rod without interference from various parts. For instance, the rod may be of a dog leg configuration to avoid frictional interference with parts of the latch which would otherwise interfere with a rod of straight configuration.

In one arrangement, the drive means includes a solenoid with a piston connected by a flexible wire, of high tensile strength to the hook member. The wire is so connected to the hook member whereby, upon the actuation of the solenoid by the application of an electric current, the plunger retracts the wire away from the hook member, thereby pivoting the hook member about its mounted axis. The hook member is thereby displaced against the action of the bias from the first closed position to the second open position until the operation of the solenoid discontinues. When the solenoid is not in operation, i.e. when the electric current is not flowing, the spring or other bias acts to return the hook member to the first closed position.

The construction and arrangement of the actuation means may be such as to allow the return of the hook member to the first closed position under the action of the bias when the actuation means is not in operation and also to allow the hook member to be moved against the bias to the second open position in the absence of operation of the actuation means. This may be achieved for example by the use of a flexible transfer means and/or by a solenoid which allows free movement of the plunger when not activated by the application of an electric current.

The actuation means may be operable by the electrical switch means. The switch means may be electrically connected to the drive means whereby the operation of the drive means may be controlled by the switch means.

The switch means may be located at a position remote from the latch. The switch means may be located on a prime mover rigged to tow the boat. The switch means may in turn be adapted for control by a radio control means or remote control. The remote control device may include a transmitter and complementary receiver. The receiver may be adapted to control the switch means in response to signals from the transmitter. The transmitter may thereby be located in the boat so that the latch may be controlled from that position.

According to the invention, the latch may include a housing. The housing may be adapted to provide at least partial protection against the elements. The housing may provide water-tight protection for at least some components of the latch. The housing preferably includes end cover means. The end cover means may be in the form of caps. The caps may be adapted to restrict the entrance of corrosive agents, such as sea water, into the interior of the housing. However, the caps are preferably adapted to enable drainage of corrosive agents from the housing. Moreover, the housing preferably includes drainage ducts strategically located to minimise the retention of residual moisture.

The housing may be of a hollow cylindrical configuration. The housing may be, for example, square, rectangular or circular in cross section. The housing may be of an elongated configuration. At one end of the housing there may extend at least part of the hook member. The housing should be so constructed as to enable full movement of the hook member between the first closed position to the second open position. The housing may contain the actuation means and at least part of the hook member.

The hook member may be pivotally mounted relative to the housing. The housing may in turn be fixedly mounted onto a suitably sturdy structure. The housing may be mounted onto the winch post of the boat trailer and so positioned to enable releasable engagement of the engagement means.

The housing preferably includes adjustable mounting means. The adjustable mounting means may include an elongated slot in a wall of the housing. The slot may be adapted to receive at least one bolt for mounting to the winch post. The mounting means may include clamp means to affix the housing to the winch post or other support structure. The mounting means may further include height adjustment means for bringing the hook member into engageable alignment with the eye member.

BRIEF DESCRIPTION OF THE DRAWINGS

To further assist in the understanding of the present invention, particularly preferred embodiments of the invention will now be described in relation to the drawings.

In the drawings.

DETAILED DESCRIPTION OF PREFERRED EMBODIMENTS

Figure 1:
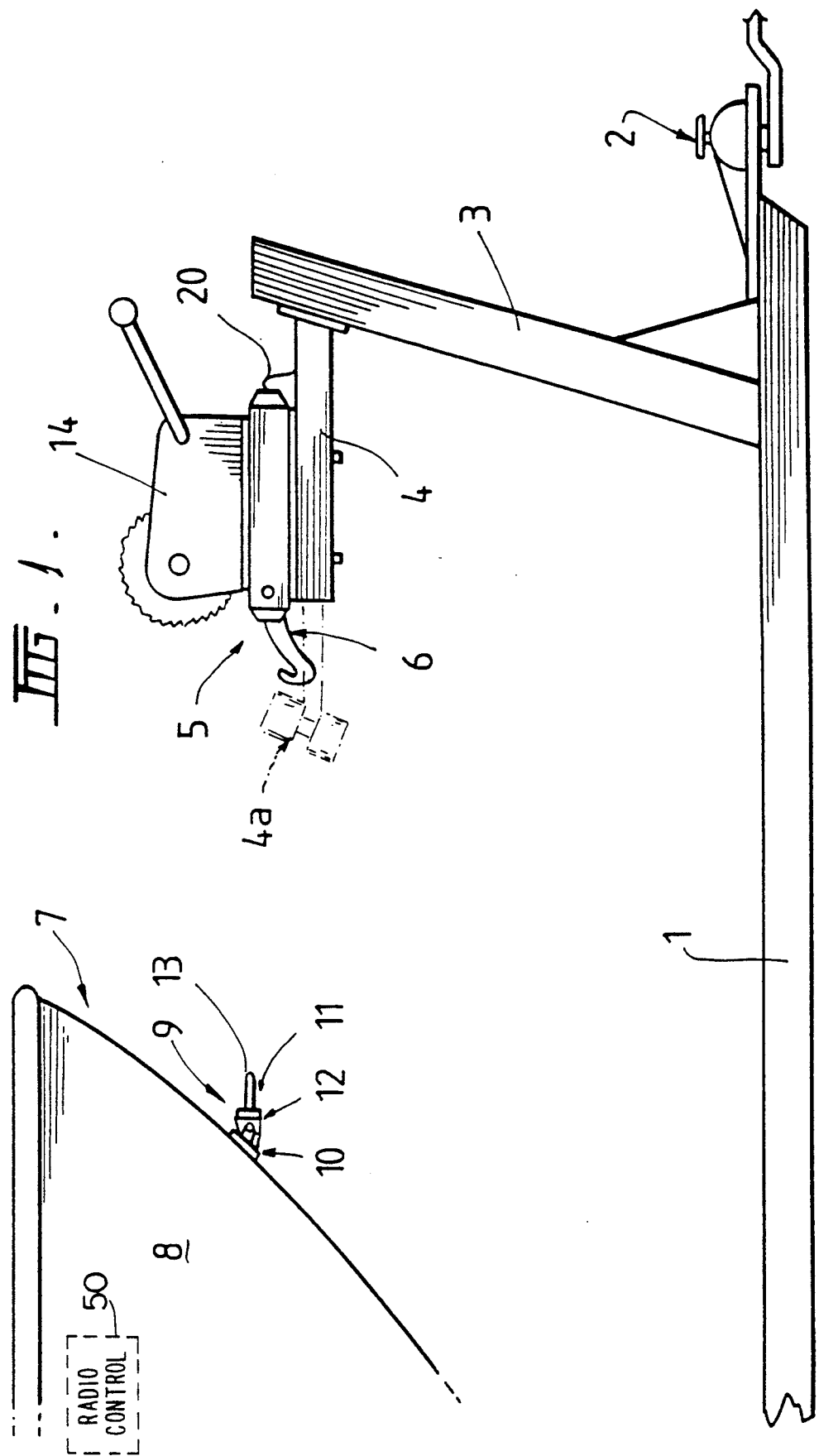
FIG. 1 shows a side view of a latch mounted to a boat trailer according to one embodiment of the invention.

Referring specifically to FIG. 1, there is shown a towing means in the form of a trailer 1 (not fully shown) mounted to a prime mover (not shown) by standard hitch means 2. As is standard in the art, the trailer 1 includes a substantially vertical and upwardly extending winch post 3 mounted near the front of the trailer 1. The winch post 3 supports a substantially horizontal support bar 4 extending rearwardly at the winch posts 3 uppermost end. Extending substantially horizontally out from the support bar 4 in a rearward direction is a pair of guide rollers 4a shown in broken lines for the sake of clarity. The guide rollers are strategically positioned in a V formation as is common in the art to ensure the central location of the boat 8 on the trailer 1 when mounted.

Immediately above the support bar 4 is fixedly mounted a latch 5 oriented such that a hook member 6, which is partially housed therein, extends rearwardly.

FIG. 1 further shows a bow 7 of a boat 8 partially mounted onto the trailer 1. The boat 8 includes an eye member 9 extending forwardly as a prow mounted on the bow 7. The eye member 9 comprises two portions, an existing eye member 10 affixed to the bow 7 and vertically oriented as is standard in the art, and an augmentary eye member 11 clamped to the existing eye member 10 by clamp means 12. The augmentary eye member 11 includes a first U-shaped member 13 horizontally oriented. The first U-shaped member 13 includes an inner surface 13a and an outer surface 13b.

The clamp means 12 is adapted to clamp onto a variety of pre-existing eye members normally found on boats of the type to which this invention is directed.

The resulting eye member 9 is positioned such that, on driving the boat 8 up onto the trailer 1, the eye member 9 is configured to engage the hook member 6. As shown in FIG. 1, a standard winch 14 is mounted on top of the latch 5. The winch 14 may be used in the usual manner to augment the securement of the boat 8 effected by the latch 5. Moreover, should the boat 8 be disabled by, for example, an inoperative motor, the winch 14 may be utilised to haul the boat 8 onto the trailer 1 in the traditional manner.

Figure 2:
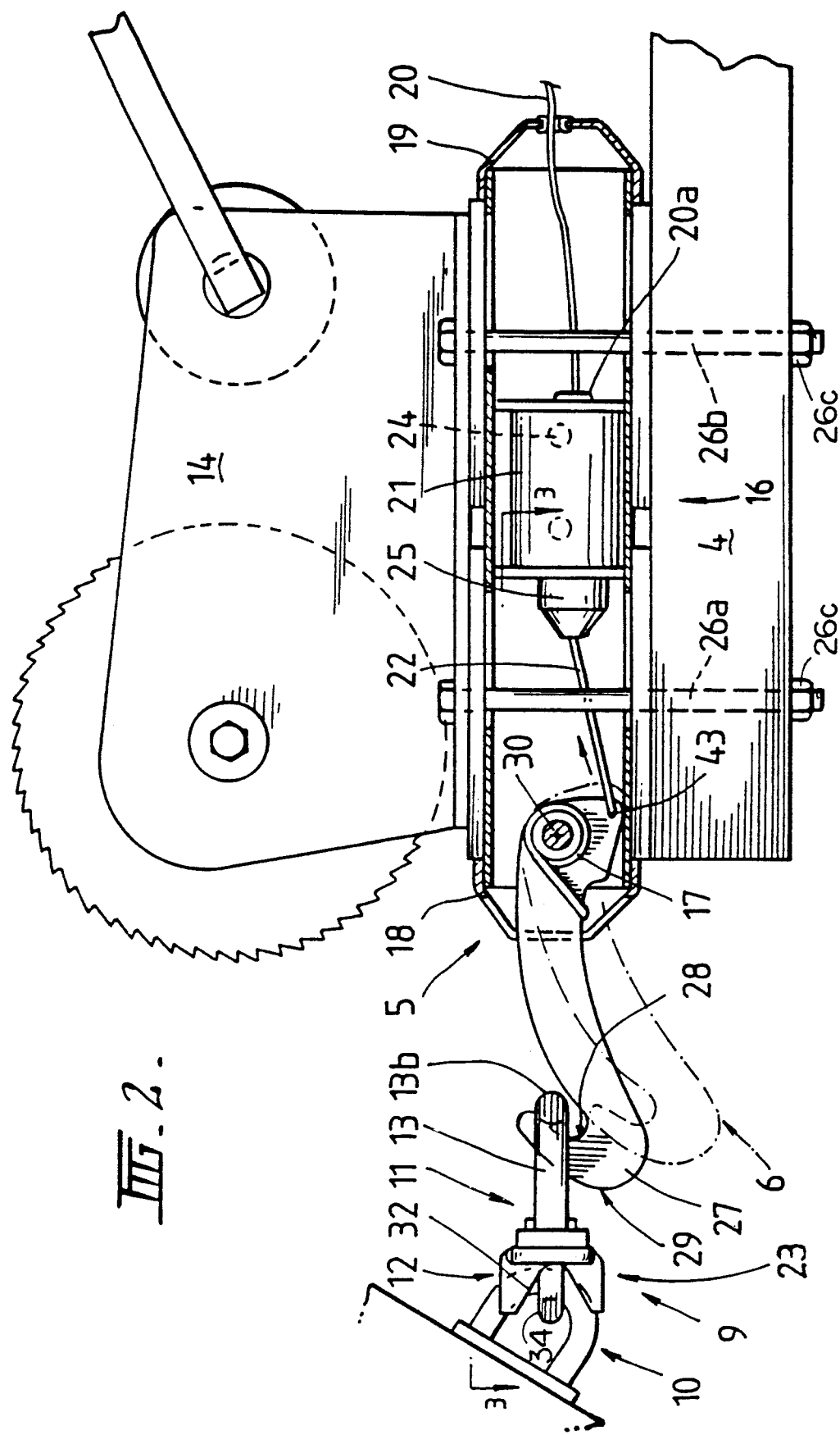
FIG. 2 shows an elongated plan view of the latch of FIG. 1 including its internal workings and first and second positions of a hook member.

As is more clearly shown in FIG. 2, the latch 5 comprises a housing 15, actuation means 16, the hook member 6, spring means 17 and end cover caps 18, 19.

The housing 15 is a section of pipe having a square cross section and is substantially covered at each end by the cover caps 18, 19. The cap 19 on the forward end of the housing 15 includes an aperture for receiving electrical connection means in the form of insulated electrical wire 20. The electrical wire 20 is connected to a set of terminals in the form of spade lugs 20a of the actuation means 16. Thus the actuation means is electrically connected to a battery power located in the prime mover (not shown), to switch means (not shown) located in the prime mover (also not shown) and to earth. The electrical connections and wires are sealed against corrosive agents such as sea water and against shorting.

In the present embodiment the electrical wire 20 extends from the latch 5 via the cap 19 to the standard electrical connection (not shown) which services the other electrical requirements of the trailer 1 such as rear lanterns. The electrical wire 20 is insulated by and encased in water tight cable. The electrical wire 20 is further insulated by a rubber seal located in the aperture of the cap 19.

The cap 18 on the rear end of the housing 15 is adapted to allow movement of the hook member 6 extending therethrough whilst maintaining an effective barrier to the incursion of the elements.

The actuation means 16 includes drive means in the form of a solenoid 21 and transfer means in the form of a substantially rigid wire rod 22. The solenoid 21 is secured to the housing by clamp means (not shown) through which adjustable abutting screws 24 are adapted to threadably engage the internal walls of the housing 15.

The solenoid 21 also includes a thermo-trip device (not shown) adapted to deactivate the solenoid 21 if the temperature thereof rises above a predetermined safe operating temperature. The thermo-trip device thereby provides a safety mechanism to prevent the solenoid 21 burning out through over-use or abuse.

The solenoid 21 includes a plunger 25, as is standard, operably connected to the hook member 6 by the wire rod 22. The wire rod 22 has a dog leg configuration as shown most clearly in FIG. 3. The dog-leg in the wire rod 22 avoids physical contact between the wire rod 22 and the rearmost bolt 26a to reduce wear and reduce loss of energy transferred from the solenoid 21 to the hook member 6.

The hook member 6 at its free end includes a free hook 27. The free hook 27 includes an internal saddle or recess 28 and an external cam surface 29 facing rearwardly.

As shown in FIG. 2, the hook member 6 is adapted to pivot between a first position represented by solid lines and a second position represented by broken lines. The hook member 6 is adapted and positioned so to pivot from the first position to the second position to engage an oncoming eye member 9. Upon the eye member 9 abutting the cam surface 29 whilst the hook member is in the first position, the cam surface 29 rides the outer surface 13b of the first U-member. The hook member 6 pivots to the second position about an axis 30 corresponding to pivot means 31 to allow engagement of the eye member 9 to the hook member 6. The eye member 9 is received in the saddle 28 upon the return of the hook member 6 to the first position by the operation of the spring means 17.

As can be seen most clearly in FIG. 2, the winch 14 and the latch 5 are mounted to the support bar 4 by bolts 26a, 26b. The bolts 26a, 26b extend from a base plate of the winch 14 through the top and bottom walls of the housing 15 and finally through the support bar 4 to which the bolts 26a, 26b are secured by suitable nuts 26c. The top and bottom walls of the housing 15 include corresponding slots (not shown) through which the bolts 26a, 26b may extend. The slots are located to accommodate a range of distance between the bolts 26a, 26b when mounted so that the pre-existing apertures normally used to bolt the winch 14 to the support bar 4 may be utilised.

Figure 3:
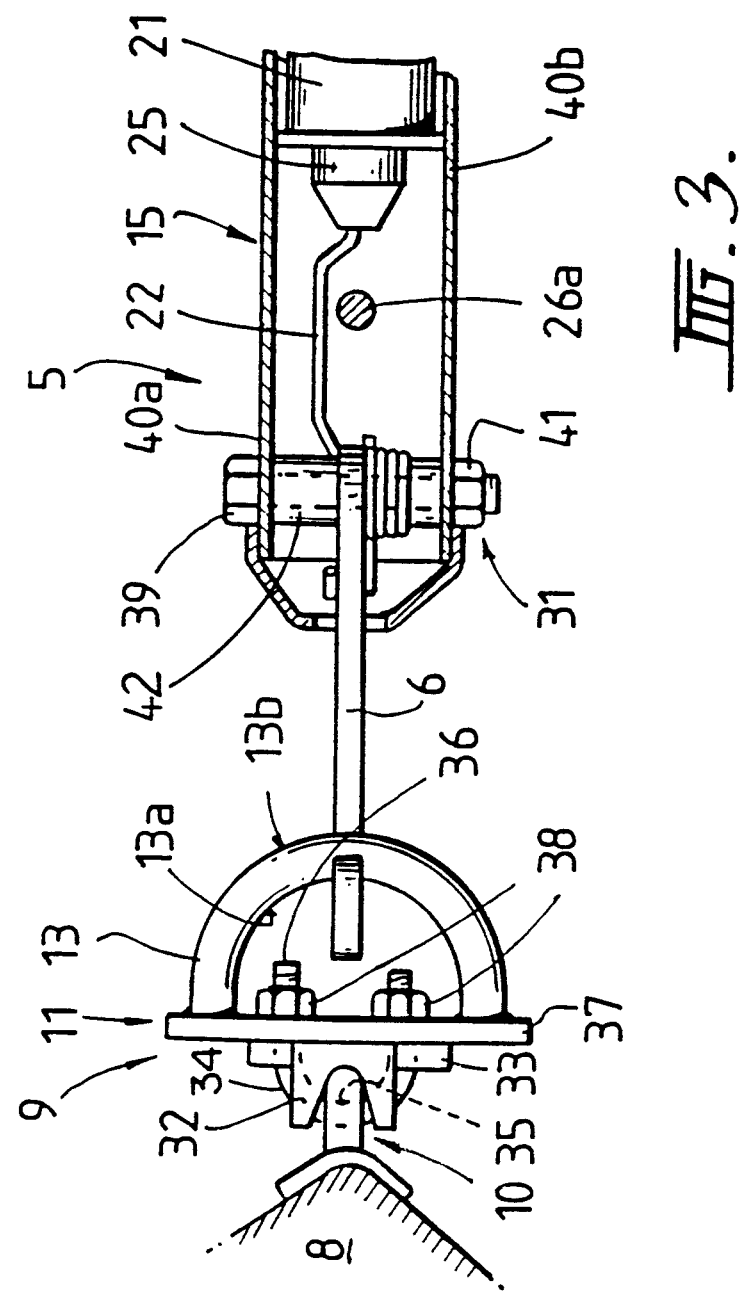
FIG. 3 is a top plan view of the latch of FIG. 1 shown in engagement with an eye member of a boat.

With reference to FIG. 3, the configuration of the augmentary eye member 11, the pivot means 31 and the configuration of the wire rod 22 are shown with further clarity.

The clamp means 23 of the adjustment member 11 includes a four-horned cradle 32 adapted for receiving in abutting relationship in the seat of the cradle 32 an outer surface of the existing eye member 10. Extending from opposite sides of and integral with the base of the cradle 32 is a cradle plate 33. When in clamped position the cradle 32 is held in abutting relationship with the existing eye member 10 by the operation of a second U-shaped member 34 including a recess 35 and a pair of arms 36. The recess 35 rests in abutting relationship with an internal surface of existing eye member 10. The second U-member 34 is cradled between opposed pairs of horns of the cradle 32. The pair of arms 36 extends forwardly through either end of the cradle plate 33. The first U-member 13 is affixed at either end to a rectangular plate 37. The rectangular plate 37 is mounted to the clamp means 23 by means of the pair of arms 36 which extends through the rectangular plate 37 and are threadably engaged thereto by a pair of nuts 38. Thus by the removal of the nuts 38 the augmentary eye member 11 may be removed from the existing eye member 10.

The pivot means 31 includes a pivot bolt 39 extending through a pair of side walls 40a, 40b of the housing 15 at the housings 15 rearmost end. The head of the pivot bolt 39 abuts the outside of one side wall 40a whereas a corresponding nut 41 is threadably engaged to the pivot bolt 39 and abuts the outside of the other side wall 40b. Interposed between the pair of side walls 40a, 40b and substantially coaxial to and surrounding the section of the shaft of the pivot bolt 39 interposed between the walls 40a, 40b is a cylindrical sleeve 42. The sleeve 42 is adapted to freely rotate about the axis 30 of the pivot bolt 39. Fixedly mounted to the sleeve 42 by welding or other adequate means is the pivotally mounted end of the hook member 6. The spring means 17 is coiled about the sleeve 42 and includes a tail suitably arranged to engage the hook member 6 and to bias the hook member 6 towards the first position. Located at the pivotal end of the hook member 6 is an aperture 43 for receiving one end of the wire rod 22. The aperture 43 is positioned a sufficient distance from the axis 30 of the pivot bolt 39 to enable adequate leverage whereby to pivot the hook member 6 from the first to the second position.

The wire rod 22, as described earlier, has a dog-leg configuration whereby to avoid contact with the bolt 26a through the wire rods 22 movement between the first and second positions.

The operation of the solenoid 21 may be controlled by the switch means. Activation of the switch means causes the solenoid plunger 25 to move in a forward direction from a first plunger position to a second plunger position respectively corresponding to the first and second positions of the hook member 6. The wire rod 22 and hence the hook member 6 are pulled forward whereby the hook member 6 pivots from the first position to the second position. By this means the eye member 9 may be released from engagement by the operation of the solenoid 21.

The operation of the solenoid 21 is governed by the switch means. The switch means is in turn governed by both a standard on/off switch (not shown) and by a radio remote control device 50. The remote control device includes a transmitter and receiver. The transmitter is portable and may be reserved for the use of the pilot of the boat. The receiver is located in the prime mover and is electrically connected to the switch means. Thus the transmitter via the receiver may be used to control the switch means and hence the solenoid 21. Therefore, the operation of the solenoid can be controlled either from within the prime mover, by means of the on/off switch, or from the boat by means of the transmitter. The radio transmitter and receiver are of the type normally used for the remote control of garage doors and security gates.

The operation of one embodiment of the invention may be described as follows. The empty trailer 1 is reversed into and partially submerged in the water at a location suitable for loading the boat 8. The pilot of the boat 8 then drives the boat 8 up onto the trailer 1. As the eye member 9 abuts the cam surface 29 of the free hook 27, the cam surface rides over the eye member 9 and in doing so the hook member 6 moves from the first position to the second position. As the hook member 6 moves into the second position, the eye member 9 engages the hook member 6. The hook member 6 then returns to the first position by the operation of the spring means 17. However, depending on the manner in which the boat 8 is mounted, the bow 7 may rise above and clear the hook member 6 as the boat 8 is powered up the trailer 1. In such a case as the power driving the boat 8 is reduced the bow 7 and hence the eye member 9 is lowered towards the hook member 6. As the bow 7 is lowered the eye member 9 falls into engagement with the hook member 6.

Clearly, if the propulsion apparatus of the boat 8 is disabled, the winch 14 may be used to haul the boat 8 onto the trailer 1 and into engagement with the latch 5. The trailer 1 is then driven out of the water whereafter the boat 8 may be further secured to the trailer 1 by fixedly attaching a locked winch cable to the boat 8. After use and especially after exposure to seawater, the latch 5 should be rinsed with fresh water and allowed to drain dry.

To unload the boat 8 from the trailer 1, the laden trailer 1 is similarly reversed into the water at a desired location. The boat 8 may be disengaged from the latch 5 either by manual means or by releasing the operation of the solenoid 21 by the remote control device or by the on/off switch. The propulsion means or winch 14 may be employed to dismount the boat 8 from the trailer 1. The boat 8 may also be allowed to slide into the water under the effect of gravity.

The advantages of the present invention will be appreciated by those skilled in the art. Whereas two operators are traditionally required to mount and dismount the boat 8, the same operation may be performed by one operator using the present invention. A sole operator may launch the boat 8 by reversing the trailer 1 in the known manner into the water. He may then climb aboard the boat 8 mounted on the trailer 1 and, using the transmitter, release the eye member 9 from the latch 5 allowing the boat 8 to be launched into the water. Upon mounting the boat 8, the boat 8 is simply driven up onto the trailer 1 as previously described so to automatically engage the latch 5 with the eye member 9. Previously, both of the above operations would generally require one operator to drive the boat 8 and another to manually operate the latch 5.

The configuration of the latch 5 further enables the pivot bolt 39 upon which the hook member 6 is mounted to bear the load of the boat 8 rather than the solenoid 21 and the wire rod 22. Therefore, the capacity of the solenoid 21 need only be sufficient to displace the hook member 6 from the first to the second position.

The components of the latch are preferably manufactured out of corrosion resistant material. It is preferred that the housing 15 be made out of stainless steel. It is still more preferable that the movable parts of the latch 5, such as the hook member 6, pivot bolt 39, etc are made out of marine grade stainless steel. Electrical wires and connections are preferably sealed against moisture. The surface of the solenoid 21 should be anodised or galvanised to afford some corrosion resistance. The end caps 18, 19 are preferably made of a suitable plastic or rubber material both to afford some flexibility for easy removal and also to resist the effects of corrosion. However, where significant buffeting is to be expected the end caps 18, 19 should be formed of a suitable metal.

While it has been convenient to describe the invention herein in relation to particularly preferred embodiments, it is to be appreciated that other constructions and arrangements are also considered as falling within the scope of the invention. Various modifications, alterations, variations and/or additions to the constructions and arrangements described herein are also considered as falling within the scope and ambit of the present invention. For example, the hook member 6 may be mounted on the boat 8 and the eye member 9 on the latch 5, the latch 5 may be mounted on the boat 8 and the eye member 9 may be mounted on the trailer 1 or other equivalent arrangements may be utilised.

The claims defining the invention are as follows:

1. A latch for releasably securing a boat having a bow to a boat trailer, said latch mounted on said trailer and comprising:
   a hook member having a distal end releasably engaging a horizontally disposed complementary eye member mounted on said bow, said hook member arranged on said latch in a vertical orientation allowing vertical movement of said distal end such that said distal end thereof is exposed to define an unobstructed vertical space thereabove to permit engagement with said complementary eye member through said vertical movement thereof; and
   actuation means adapted for operation from a remote location to disengage said hook member and said complementary eye member;
   wherein said hook member is biased to rest in a first closed position thereby securing said boat but may be moved in a vertical plane against said bias to a second open position to engage and disengage said complementary eye member by one of the operation of said actuation means and by contact between said complementary eye member and said hook member.

2. A latch according to claim 1 wherein said actuation means is operable by radio control.

3. A latch according to claim 1 wherein a spring means acts to bias said hook member to rest in said first closed position.

4. A latch according to claim 1 wherein said actuation means is electrically energisable.

5. A latch according to claim 1 further comprising a housing and means for pivotally mounting said hook member to said housing.

6. A latch according to claim 5 wherein said hook member includes a cam surface and wherein said action of said complementary eye member comprises the application of pressure on said cam surface as said eye member moves towards said hook member whereby to urge said hook member to pivot relative to said housing whereby to adopt said second open position.

7. A latch according to claim 5 wherein said actuation means comprises a solenoid connected via transfer means to said hook member wherein upon the actuation of said solenoid by the application of an electric current thereto, said transfer means pivots said hook member against the action of said bias.

8. A latch according to claim 7 wherein said transfer means is a rod member.

9. A latch according to claim 7 wherein said transfer means is a flexible wire.

10. A latch for releasably securing a boat having a bow to a boat trailer, said latch comprising:
    mounting means for mounting said latch on said trailer;
    a hook member having a distal end releasably engaging a horizontally disposed complementary eye member mounted on said bow, said hook member arranged on said latch in a vertical orientation allowing vertical movement of said distal end such that said distal end thereof is exposed to define an unobstructed vertical space thereabove to permit engagement with said complementary eye member through said vertical movement thereof; and
    actuation means adapted for operation from a remote location to disengage said hook member and said complementary eye member;
    wherein said hook member is biased to rest in a first closed position thereby securing said boat and adapted to be moved in a vertical plane against said bias to a second open position to engage and disengage said complementary eye member by one of the operation of said actuation means and by contact between said complementary eye member and said hook member.

11. A latch according to claim 10 wherein said actuation means is electrically energisable.

12. A latch according to claim 10 wherein a spring means acts to bias said hook member to rest in said first closed position.

13. A latch according to claim 12 further comprising a housing and means for pivotally mounting said hook member to said housing.

14. A latch according to claim 13 wherein said hook member includes a cam surface and wherein said complementary eye member presses on said cam surface of said hook member whereby to urge said hook member to pivot relative to said housing toward said second open position against the action of said spring means.

15. A latch according to claim 14 wherein said actuation means comprises a solenoid connected via transfer means to said hook member wherein upon the actuation of said solenoid by the application of an electric current said transfer means pivots said hook member against the action of said spring means.

16. A latch according to claim 15 wherein said transfer means is a rod member.

17. A latch according to claim 15 wherein said transfer means is a flexible wire.

18. The latch of claim 1 wherein said complementary eye member comprises a first eyelet and a means for clamping and horizontally orientating said first eyelet to a second eyelet vertically oriented and mounted on said bow so that said first eyelet can releasably engage said hook member.

19. The latch of claim 18 wherein said means for clamping and horizontally orientating said first eyelet comprises a saddle for engaging a portion of said second eyelet and a U-shaped clamp and fastener for connecting said second eyelet to said saddle.

20. The latch of claim 10 wherein said complementary eye member comprises a first eyelet and a means for clamping and horizontally orientating said first eyelet to a second eyelet vertically orientated and mounted on said bow so that said first eyelet can releasably engage said hook member.

21. The latch of claim 20 wherein said means for clamping and horizontally orientating said first eyelet comprises a saddle for engaging a portion of said second eyelet and a U-shaped clamp and fastener for connecting said second eyelet to said saddle.

* * * * *